US011349653B2

(12) United States Patent
Athmalingam et al.

(10) Patent No.: US 11,349,653 B2
(45) Date of Patent: May 31, 2022

(54) MULTIPLE-SITE PRIVATE NETWORK SECURED BY IPSEC USING BLOCKCHAIN NETWORK FOR KEY EXCHANGE

(71) Applicant: Hewlett Packard Enterprise Development LP, Houston, TX (US)

(72) Inventors: Manimuthu Muthaiya Athmalingam, Bangalore (IN); Haris Palapra, Bangalore (IN); Dinesh Pulivalam Ramakrishnan, Bangalore (IN); Balakumaran Kannan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 650 days.

(21) Appl. No.: 16/224,758

(22) Filed: Dec. 18, 2018

(65) Prior Publication Data
US 2020/0195431 A1    Jun. 18, 2020

(51) Int. Cl.
*H04L 29/06* (2006.01)
*H04L 9/08* (2006.01)
(Continued)

(52) U.S. Cl.
CPC .......... *H04L 9/0891* (2013.01); *H04L 9/0637* (2013.01); *H04L 63/0485* (2013.01);
(Continued)

(58) Field of Classification Search
CPC . H04L 9/0891; H04L 9/0637; H04L 63/0485; H04L 63/061; H04L 63/123;
(Continued)

(56) References Cited

U.S. PATENT DOCUMENTS 10,554,746 B2 * 2/2020 Bathen ................. H04L 9/3247
10,701,046 B1 * 6/2020 Kaliski, Jr. ........... H04L 9/0836
(Continued)

FOREIGN PATENT DOCUMENTS

WO   WO-2017178956    10/2017

OTHER PUBLICATIONS

Blockchain @ Telco, (Web Page), Retrieved Sep. 7, 2018, 13 Pgs.
(Continued)

*Primary Examiner* — Mahfuzur Rahman
(74) *Attorney, Agent, or Firm* — Sheppard Mullin Richter & Hampton LLP (57) ABSTRACT

In some implementations, a method includes: preparing, at a first networking device, an incoming security key update request transaction, the incoming security key update request transaction including a request by the first networking device to use an incoming security key for incoming communications with other networking devices during an IPsec session, where the first networking device and the other networking devices communicate over a blockchain network including a blockchain; transmitting the incoming security key update request transaction from the first networking device to the blockchain network for validation; updating a copy of the blockchain with a block, the block including a validation of the incoming security key update request transaction that was transmitted to the blockchain network; and using at least the updated blockchain to update an IPsec security association (SA) or an IPsec security policy (SP) used by the first networking device.

20 Claims, 7 Drawing Sheets

(51) Int. Cl.
*H04L 9/40* (2022.01)
*H04L 9/06* (2006.01)

(52) U.S. Cl.
CPC .......... *H04L 63/061* (2013.01); *H04L 63/123* (2013.01); *H04L 63/20* (2013.01); *H04L 2209/38* (2013.01)

(58) Field of Classification Search
CPC ... H04L 63/20; H04L 2209/38; H04L 63/164; H04L 9/3297; H04L 9/3239
See application file for complete search history.

(56) References Cited

U.S. PATENT DOCUMENTS

| | | |
|---|---|---|
| 11,080,247 B2* | 8/2021 | Padmanabhan ..... G06F 21/6218 |
| 2017/0011460 A1* | 1/2017 | Molinari ............... G06F 21/645 |
| 2017/0207917 A1 | 7/2017 | Davis |
| 2018/0109541 A1 | 4/2018 | Gleichauf |
| 2019/0372779 A1* | 12/2019 | Monica ................. H04L 9/3255 |
| 2019/0379664 A1* | 12/2019 | Suthar ................. H04L 63/0892 |

OTHER PUBLICATIONS

Blockchain, Digital Trust and Distributed Ledger Technology—Going Big Business, (Web Page), Retrieved Aug. 14, 2018, 22 Pgs.
Dale, O., Beginner's Guide to Centrality: Peerto Peer Marketplace for dApps, (Web Page), Apr. 26, 2018,, 11 Pgs.

* cited by examiner

MULTIPLE-SITE PRIVATE NETWORK SECURED BY IPSEC USING BLOCKCHAIN NETWORK FOR KEY EXCHANGE

DESCRIPTION OF RELATED ART

A virtual private network (VPN) extends a private network across public networks, and enables users to send and receive data across public networks as if the devices were directly connected on a private network. Applications running across the VPN may therefore benefit from the functionality, security, and management of the private network. VPN often utilizes Internet Protocol Security (IPsec).

IPsec describes a secure network protocol suite of standards that use cryptography to secure communications over Internet Protocol (IP) networks. It may be used to authenticate endpoint hosts along with providing data confidentiality and integrity. IPsec may use the Internet Key Exchange (IKE) protocol to authenticate each peer in an IPsec session, negotiate security associations (SAs) between peers, and handle the exchange of session keys.

An IPsec data exchange between two peers may include five steps: i) initiating an IPsec session, ii) IKE Phase 1, iii) IKE Phase 2, iv) data transfer, and v) IPsec session termination. An IPsec session initiation (e.g., a VPN tunnel) may be triggered when network traffic is flagged for protection ("interesting traffic") according to some IPsec security policy (SP) configured in IPsec peers. For example, network traffic determined to be of a particular type may be flagged for protection based on a security policy, whereas other traffic may travel normally through a public network. After session initiation, an IKE process may begin. During IKE phase 1, security parameters and keys required to establish an IKE security association (SA) (formerly referred to as an ISAKMP SA) may be negotiated. IKE phase one may include: authenticating identities of IPsec peers; the negotiation of a common IKE SA policy between peers to protect IKE exchange; a Diffie-Hellman (DH) key exchange for the creation of shared secret keys; and setting up a secure tunnel to negotiate IKE Phase 2 parameters.

During IKE phase 2, the two peers may negotiate a shared IPsec policy; and negotiate the security parameters and incoming/outgoing security keys required to establish two unidirectional IPsec SAs, one for incoming traffic and one for outgoing traffic. Thereafter, interesting traffic may be exchanged during the IPsec session, with packets being encrypted/decrypted at peers using encryption specified in an IPsec SA. Additionally, interesting traffic may be authenticated.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc., in a public, private, and/or hybrid networking environment.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," "a blockchain application," or "a blockchain transaction," it should be appreciated that the embodiment may more generally be applied using a "distributed ledger address," "a distributed ledger application," and/or "a distributed ledger transaction."

As used herein, the term "blockchain address" refers to an identifier for a receiver or a sender in a blockchain recorded transaction. For example, a unique blockchain addresses may be associated with an IPsec networking device.

As used herein, the term "IPsec networking device" refers to a device on which an IPsec protocol operates. For example, an IPsec protocol may operate on a router, a gateway switch, a firewall device, a server, a workstation, etc.

Figure 1:
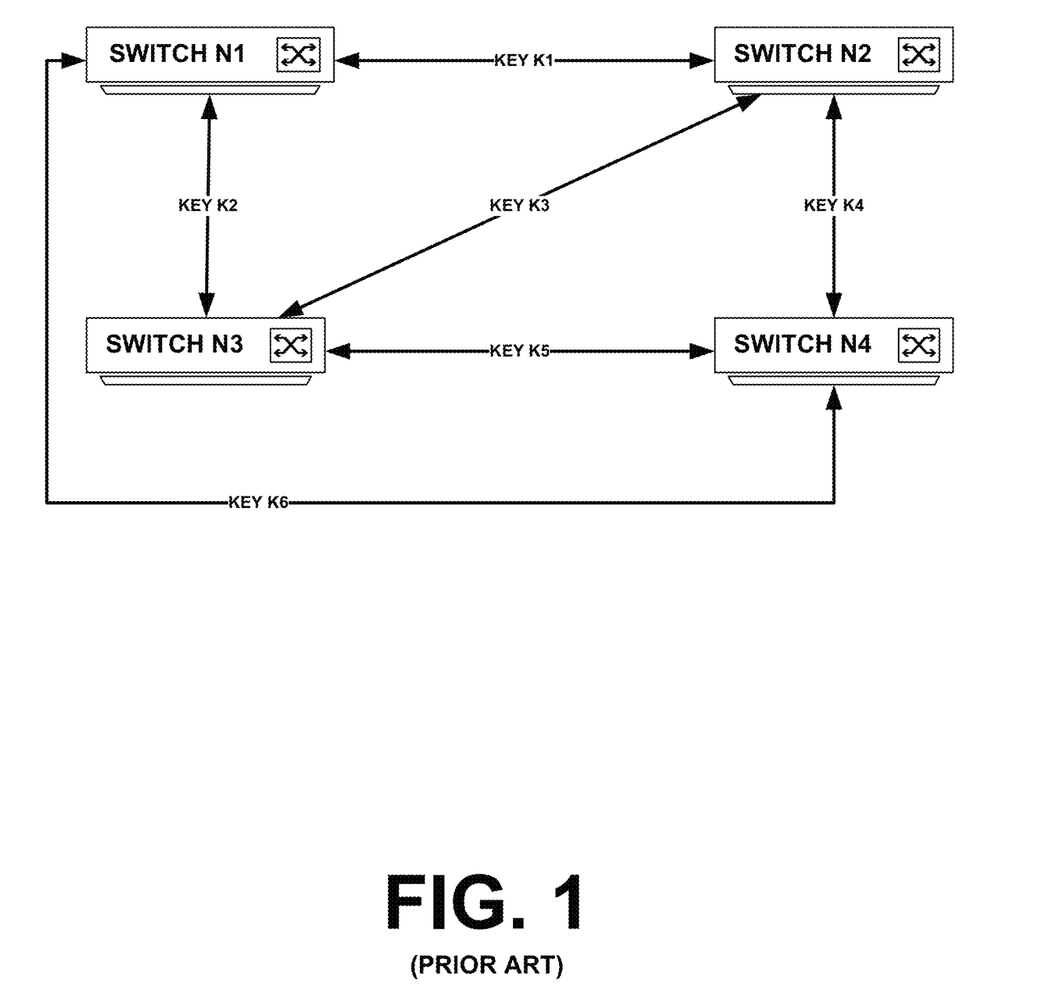
FIG. 1 illustrates security key assignment in some current systems that use IKE with IPsec.

As alluded to above, in some standard implementations of IPsec utilizing IKE, each peer in a peer-to-peer connection requires a unique connection specific security key for encrypting and/or authenticating both incoming and outgoing communications that is negotiated during IKE Phase 2. As such, in a network having N IPsec peers (and a total of N+1 IPsec devices), each peer is required to maintain 2N security associations, i.e., an incoming SA and outgoing SA for each peer, where N is a positive integer. This is illustrated by FIG. 1, which illustrates one standard implementation of a network of four IPsec enabled gateway switch devices N1-N4 that use IKE. As illustrated in this example, each IPsec gateway switch can maintain six SAs: one incoming SA and one outgoing SA for each of the three peer switches. Further, because each peer-to-peer connection requires a unique set of connection keys, this may lead to a higher number IPsec policies per peer, namely two IPsec policies per peer. As such, in some standard implementations of IPsec, each peer is required to maintain 2N IPsec policies and 2N SAs during operation.

By way of example, consider a conventional IPsec communication configuration whereby nodes N1 and N2 agree to securely communicate using a common key K1. When node N1 sends data to N2 in accordance with IPsec, it may encrypt the data using K1. Upon receiving the data, N2 may decrypt the data using K1. Alternatively, when node N2 want to send a data to N1 in accordance with IPsec, it may encrypt the data using K1. Upon receiving the data, N1 may decrypt the data with K1. In this illustrated example, a simplified representation of a SA table of node N1 may be illustrated by Table 1, below.

TABLE 1

| Source IP Address | Destination IP Address | Security Parameter Index (SPI) | Protocol | Algorithm and Key |
|---|---|---|---|---|
| N1 IP address | N2 IP address | 1 | Authentication Header (AH) | Message Digest 5 (Md5) - K1 |
| N2 IP address | N1 IP address | 1 | AH | Md5 - K1 |

As illustrated by Table 1, although node N1 maintains a single security K1 for IPsec communications with node N2, it is required to maintain two SAs in its SA table.

As another example, consider another conventional IPsec communication configuration with three nodes N1, N2, and N3, whereby nodes N1 and N2 agree to securely communicate using key K1, and whereby nodes N1 and N3 agree to securely communicate using key K2. In this example, a simplified representation of a SA table of node N1 for the conventional IPsec implementation may be illustrated by Table 2, below.

TABLE 2

| Source IP Address | Destination IP Address | SPI | Protocol | Algorithm and Key |
|---|---|---|---|---|
| N1 IP address | N2 IP address | 1 | AH | Md5 - K1 |
| N2 IP address | N1 IP address | 1 | AH | Md5 - K1 |
| N1 IP address | N3 IP address | 1 | AH | Md5 - K2 |
| N3 IP address | N1 IP address | 1 | AH | Md5 - K2 |

As illustrated by Table 2, although node N1 maintains a single security key for IPsec communications with each peer node (K1 for N2, and K2 for N3), it is required to maintain two SAs for each peer node in its SA table for a total of four SAs. As the foregoing examples illustrate, although in a conventional IPsec communication configuration a node may only need to maintain N keys for N peers, it may need to maintain 2N SAs for N peers.

Moreover, in a typical network that utilizes IPSec, security keys may be configured to be valid only for a limited amount of time or packet transmissions to add additional security to the system. In such an environment, an IPsec application running on a device may configure a key rollover function that causes new security keys to become valid at some time in the future. During a key rollover, there may be a period of time during which a device running an IPSec application can maintain one outgoing security key and two incoming security keys (old key and new key) for each peer. As such, during key rollover, a peer may be required to maintain 3N SAs. Accordingly, the scalability of some typical IPsec networks may be limited due to the large number of IPsec SAs and SPs that need to be maintained. SP/SA lookups may play a significant role in overall system performance, particularly in VPN environments where packets are encrypted. As such, reducing the number of SP/SA rules may help improve system performance.

Implementations described herein are directed to reducing the configuration effort in IPsec and providing improved performance by reducing the number of IPsec SAs and SPs required for maintaining connections between peers. Specifically, implementations described herein are directed to using a single unique key for each peer's incoming traffic (e.g., one key per destination IP address) that is shared with all peers by means of a blockchain network. Implementations described herein may be particularly advantageous in multisite virtual private network (VPN) setups where there may be no need to maintain secrecy between peers because the goal is to create a single VPN among peers. As such, rather than requiring unique incoming security key for each peer, an IPsec networking device may configured with just one incoming security key.

By virtue of implementations described herein, the number of IPsec SAs and SPs may be significantly reduced. Additionally, IPsec performance may be improved by allowing for faster key lookup. Further, the implementations described herein may provide for more user friendly configuration options as fewer peers need to be configured for incoming communications. Moreover, by virtue of using a blockchain to maintain each peer's unique incoming security key, the latency of initiating IPsec communications may be reduced between peers by obviating the need to negotiate security keys beforehand. These and other benefits that may be realized by implementations described herein can be further appreciated from the description.

Figure 2:
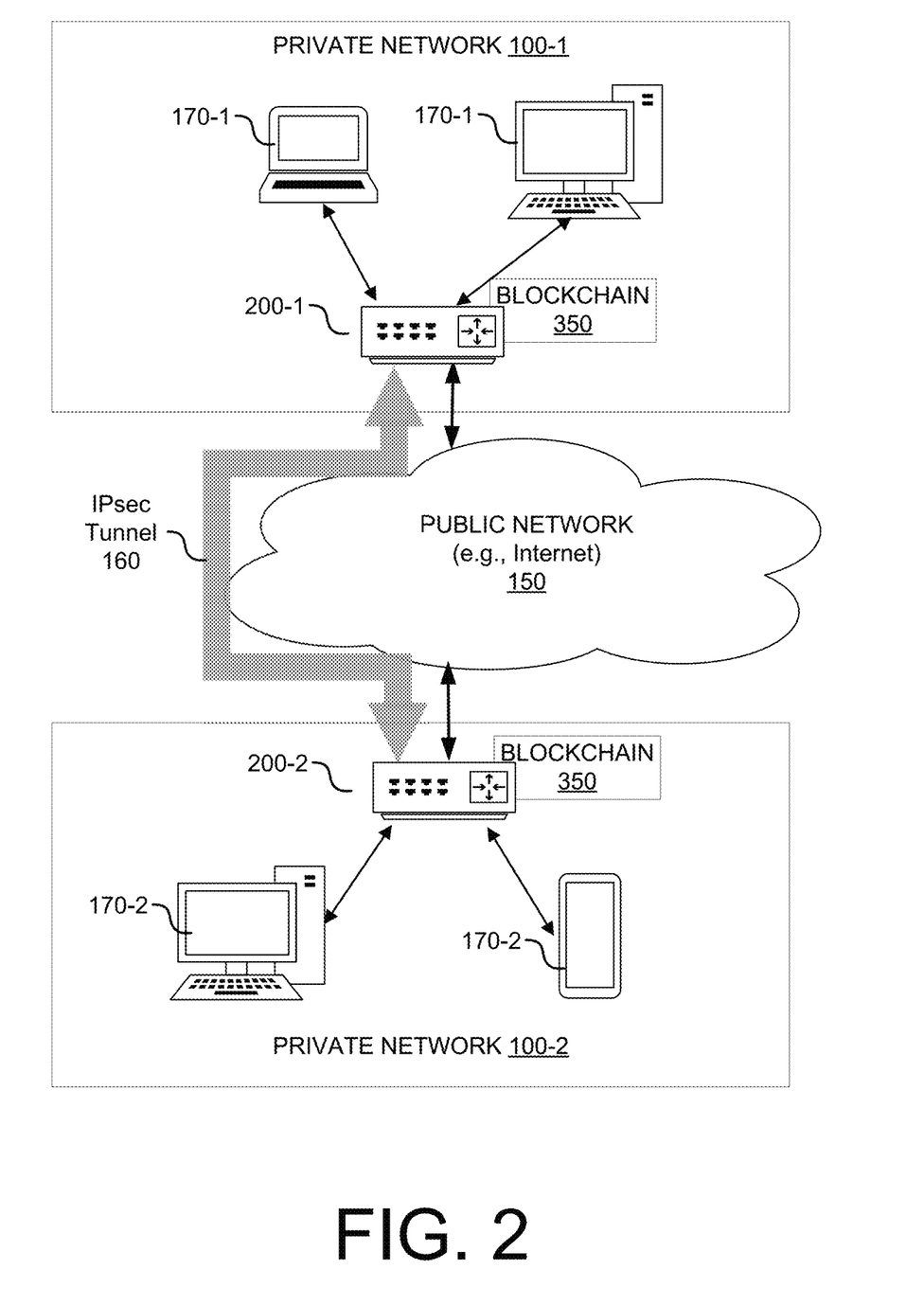
FIG. 2 illustrates an example environment in which the disclosed technology may be implemented.

FIG. 2 illustrates an example environment in which the disclosed technology may be implemented. In the environment of FIG. 2, IPsec may be used to provide a secure connection over public network 150 (e.g., the Internet) between devices on private network 100-1 and devices on private network 100-2 (referred to as "private networks 100"). For example, private network 100-1 may correspond to a first local area network (LAN) or wide area network (WAN) served by IPsec networking device 200-1 (e.g., an IPsec router), and private network 100-2 may correspond to a second LAN or WAN served by IPsec networking device 200-2 (e.g., an IPsec router).

In the example environment of FIG. 2, peer IPsec networking devices 200-1 and 200-2 (referred to as "IPsec networking devices 200") are configured to authenticate and initiate a secure connection through public network 150. IPsec networking devices 200-1 and 200-2 may initiate an IPsec data exchange to establish a connection including a secure IPsec tunnel 160 (e.g., VPN tunnel). As part of IPsec data exchange process, incoming and outgoing security keys, IPsec SAs, and IPsec SPs may initialized and updated over time. IPsec networking devices 200 may function to transparently process and route information from/to user devices 170-1 (e.g., workstations, mobile devices such as laptops, etc.) on private network 100-1 to/from user devices 170-2 (e.g., workstations, mobile devices such as laptops, etc.) on private network 100-2, in accordance with an IPsec protocol. In some implementations, the environment of FIG. 2 may also implement pre-shared keys (PSK) or a certifying authority that may be used to avoid man in middle attacks or rouge nodes in the network.

By way of example, private networks 100-1 and 100-2 may correspond to two remote sites associated with an enterprise. In this example, IPsec may be used to build a virtual private network (VPN) for the two remote sites across a public network (e.g., the Internet). It should be appreciated that implementations described herein do not need to be limited to the network topology illustrated in FIG. 2. For instance, in the enterprise context, IPsec may be implemented to provide remote-access VPN to individual user devices, to provide intranet VPNs to connect remote sites, and/or to provide extranet VPNs. In the case of remote-access VPN access being provided to a user device (e.g., user's laptop), the user device may itself contain a VPN client configured to run an IPsec application and it may function as an IPsec networking device 200 in accordance with the disclosure.

Although two peer IPsec networking devices 200 connecting two private networks 100 through one secure connection over a public network 150 are illustrated in this example, it should be appreciated that implementations described herein may apply to environments including any plurality of peer IPsec networking devices 200 connecting any number of private networks 100 (e.g., any number of remote sites) over a public network 150 using any number of secure connections. Further, although IPsec networking devices 200 are illustrated in FIG. 2 as IPsec routers, it should be appreciated that an IPsec networking device 200 may be any networking device capable of implementing an IPsec protocol to securely communicate across a public network with another networking device. For example, an IPsec networking device 200 may be implemented as a router, a gateway switch, a server, a workstation, a laptop, etc.

In the environment of FIG. 2, peer IPsec networking devices 200 function as a blockchain network of devices that are configured to maintain a copy of a blockchain 350 including information about each peer IPsec networking device 200, including the incoming security key and IP address presently associated with each peer. In this blockchain network, each peer may become the owner of an incoming security key that cannot be modified by other peers, but that can be used to send secure messages to that particular peer. Peers may over time change their incoming security key as part of a key rollover process as per the peer's configuration. As further discussed below, changes to incoming security keys may be written to the blockchain 350 such that other peers may begin forwarding secure packets using the new incoming security key. By virtue of this implementation, peer IPsec networking devices 200 may be configured to have just one IPsec SP and SA for all incoming traffic, along with an SP and SA for outgoing traffic to each remote peer.

By way of example, consider the previous case of three nodes N1, N2, and N3. By implementing implementations of the disclosure, a simplified representation of a SA table of node N1 in accordance with the present disclosure may be illustrated by Table 3, below.

TABLE 3

| Source IP Address | Destination IP Address | SPI | Protocol | Algorithm and Key |
|---|---|---|---|---|
| any | N1 IP address | 1 | AH | Md5 - K1 |
| N1 IP address | N2 IP address | 1 | AH | Md5 - K2 |
| N1 IP address | N3 IP address | 1 | AH | Md5 - K3 |

As illustrated, N1 is only required to maintain N+1=3 SAs in this case.

In some implementations, security in the environment of FIG. 2 may be further enhanced by using a chain of trust whereby nodes are added to the blockchain network only if it is trusted by an existing node or by making one node to act as an additional certifying authority for another node in the network.

Figure 3:
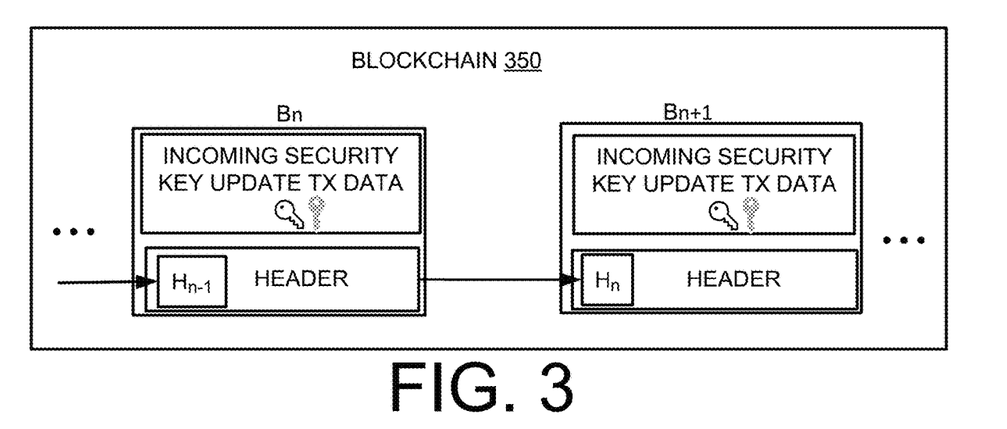
FIG. 3 illustrates one exemplary data structure for a blockchain that may be stored on a IPsec networking device, in accordance with the disclosure.

FIG. 3 illustrates one example data structure for a blockchain 350 that may be stored on a plurality of decentralized networking device 200, in accordance with implementations of the disclosure. As illustrated, in this example, the data structure of blockchain 350 is an ordered, back-linked list of blocks, including incoming security key update transactions made by IPsec networking devices. In this specific implementation, each block of the blockchain comprises a header and transaction information related to one or multiple transactions conducted with respect to incoming security key updates on the blockchain network. The header of each block (except for e.g., the genesis block) may include the hash of the previous block header and/or hash of the transaction tree root (merkle root hash). In implementations, the header may comprise additional block metadata such as a timestamp (e.g., the approximate creation time of the block), hash trees (e.g., for transaction information, state information, etc.) and other information. It should be appreciated that many other distributed ledgers other than the blockchain illustrated by FIG. 3 may be used to implement the technology described herein.

In some implementations, blockchain 350 may implemented as a "permissioned" or "private" blockchain in which only permissioned entities (e.g., IPsec networking devices 200) may validate transactions. In these implementations, upon creation/configuration of the blockchain network, each IPsec networking device 200 may be assigned a unique private key to make changes and/or transactions on the blockchain. Additionally, a corresponding public key associated with the IPsec networking device 200 may be distributed to the other IPsec networking devices 200 and/or stored on the blockchain 350. In implementations, the private and public key pairs assigned to each IPsec networking device 200 may be implemented in accordance with the digital signature algorithm (DSA) or the elliptic curve digital signature algorithm (ECDSA).

Figure 4:
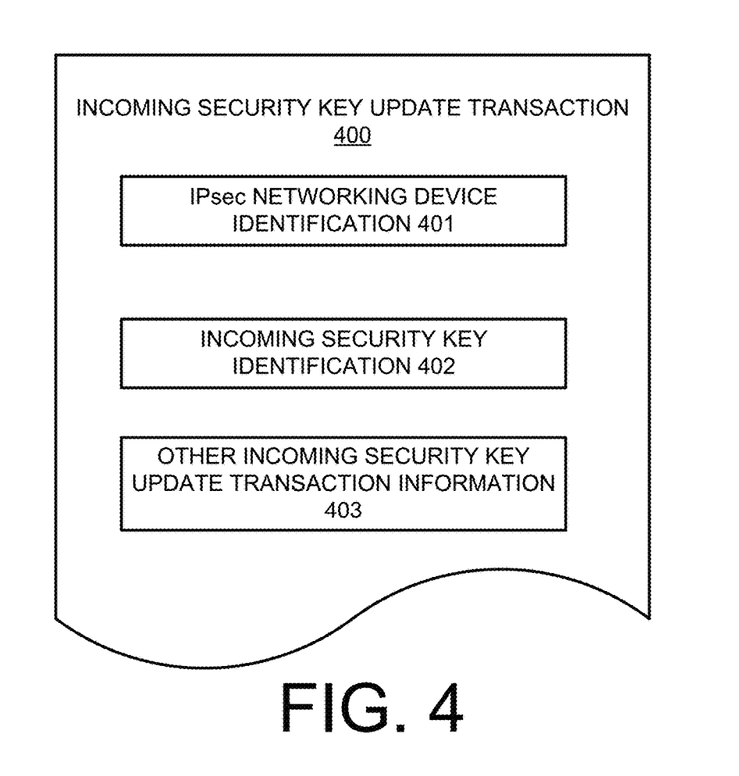
FIG. 4 illustrates an example incoming security key update transaction that may be stored in a block of a blockchain, in accordance with implementations of the disclosure.

FIG. 4 illustrates an example incoming security key update transaction 400 that may be stored in a block of the blockchain, in accordance with implementations. A transaction 400 may include one or more of an IPsec networking device identification 401 (e.g., IP address associated with the IPsec networking device broadcasting the transaction 400 to the blockchain network), an incoming security key identification 402 (e.g., incoming security key that is updated, whether a rollover key or key that is part of a new connection), and other incoming security key update transaction information 403 (e.g., MAC address associated with the IPsec networking device sharing the transaction, timestamp of transaction, public key information, etc.).

Figure 5:
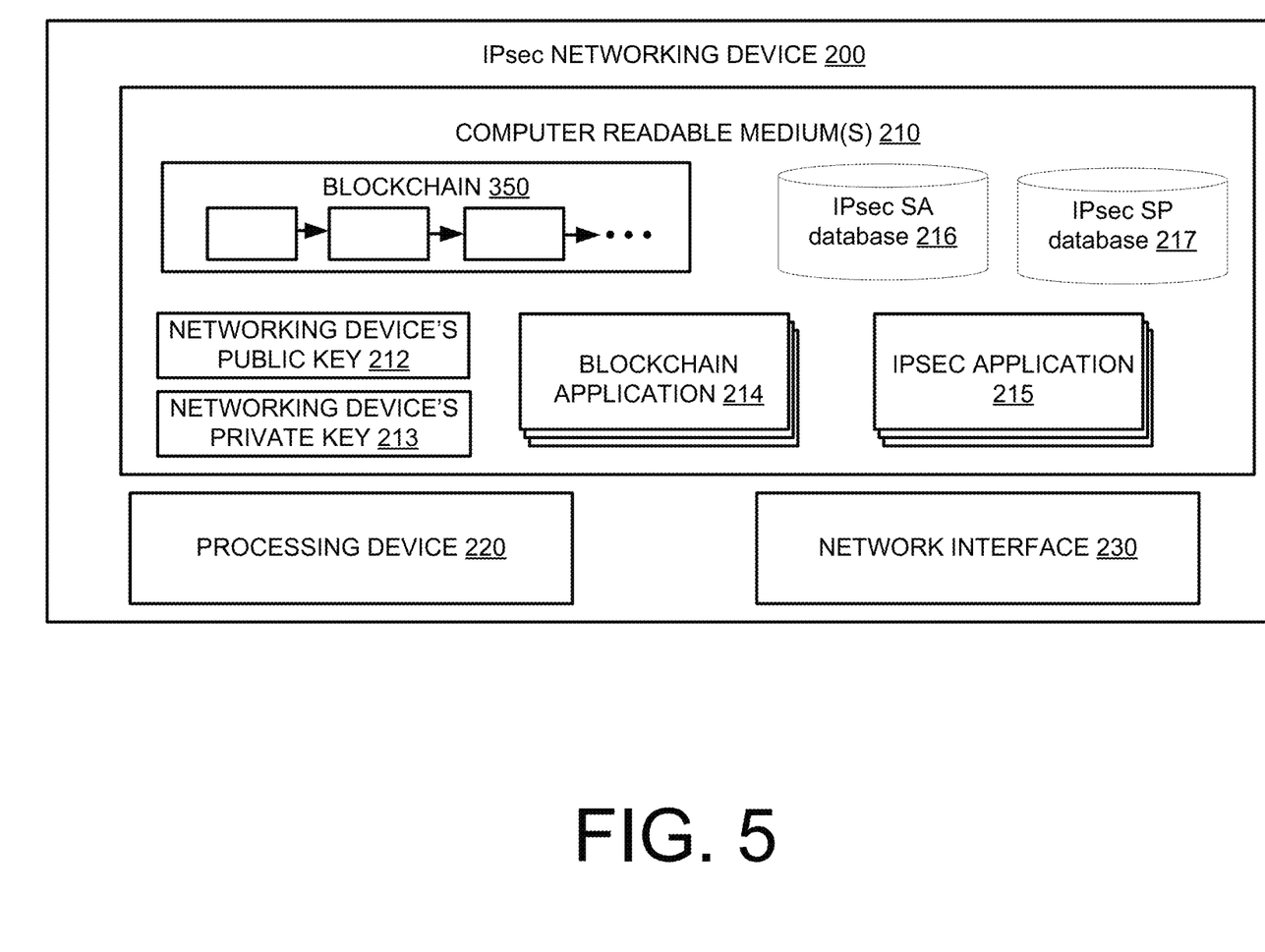
FIG. 5 is a schematic block diagram illustrating one particular example of a IPsec networking device, in accordance with implementations of the disclosure.

FIG. 5 is a schematic block diagram illustrating one particular example of an IPsec networking device 200, in accordance with the disclosure. As illustrated, a device 200 may include one or more computer readable mediums 210, a processing device 220 (e.g., a processor to execute machine readable instructions such as instructions of a blockchain application 214 and/or an IPsec application 215), and a network interface 230 to communicate with other network devices, including IPsec networking devices. Some non-limiting examples of communication methods that may be implemented by network devices in accordance with the disclosure may include: wired communications methods, such as cable, fiber-optic, or DSL; or wireless communications methods, such Wi-Fi, cellular communications, or satellite communications, or some combination thereof.

As illustrated, IPsec networking device 200 may store a respective copy of a blockchain 350, and its own public key 212 and private key 213 that may correspond to a blockchain address for blockchain transactions. For example, a private key 213 may be generated through a blockchain application 214, a public key 212 may be derived from the private key, and a blockchain address may be derived from the public key 212 by applying additional cryptographic algorithm(s). In some implementations, the public key 212 and blockchain address are the same.

Private key 213 may be uniquely known by IPsec networking device 200, and may be used to digitally sign IPsec incoming security key update transactions that are submitted to the blockchain network for authentication. In some implementations, device 200 may also store a list of public keys utilized by other IPsec networking devices 200 as part of the blockchain network. For example, the list may be maintained as a table associating the IP address of each IPsec networking device with a respective public key. The list of other keys may be used to decrypt incoming security key update transactions submitted by other IPsec networking devices to the blockchain network for verification.

IPsec networking device 200 may include IPsec SA database or table 216 and IPsec SP database or table 217. IPsec SA database 216 may be to maintain IPsec SAs between device 200 and peers, where each SA may govern security information that describes the particular security mechanisms used for either incoming or outgoing secure communications between device 200 and a peer. For example, a SA may a destination IP address, a SPI, a protocol (e.g., AH or ESP), an encryption algorithm and key, and/or an authentication algorithm and key. As alluded to above, by virtue of using a blockchain 350 to maintain a unique incoming security key for each peer, in some implementations only one IPsec SA may need to be stored in database 216 for incoming communications. IPsec SP database 217 may be to maintain IPsec SPs between device 200 and peers, where each SP may specify one or more rules for deciding whether a packet needs to be processed by IPSec or not, and if so, general guidelines for how security should be provided. For example, a SP may include a source IP address subnet (e.g., range of IP addresses such as 127.0.0.1 to 127.0.0.10), a destination IP address subnet, an IP protocol, a layer 3 port (e.g., 89 for Open Shortest Path First (OSPF)), an interface name (e.g., eth1), and/or a list of applicable SAs.

IPsec networking device 200 may store a blockchain application 214 that may be used to communicate with a blockchain network including IPsec networking devices 200 to make incoming security key update transactions, to validate blockchain transactions, and/or to update the blockchain 350. For instance, blockchain application 214 may be implemented as a multisite IPsec key exchanging application for exchanging incoming security keys across sites located in different private networks.

IPsec networking device 200 may also store an IPsec application 215 that may be used to perform functions such as creating and maintaining SAs with peer devices that are stored in database 216, creating and maintaining SPs that are stored in database 217, generating new security keys for IPsec sessions, and performing other functions in accordance with an IPsec protocol. In some implementations, IPsec application 215 and blockchain application 214 may be integrated.

Figure 6:
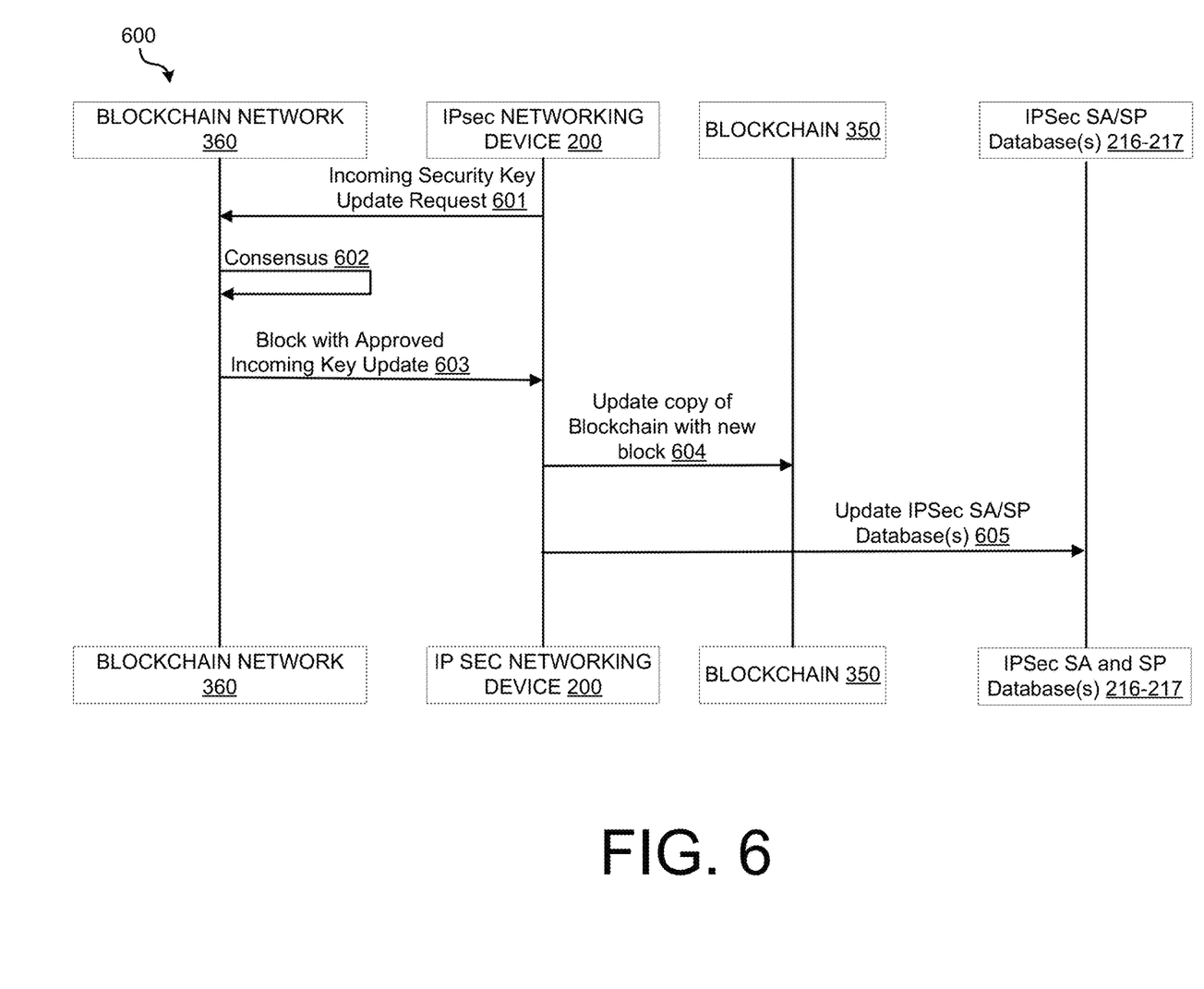
FIG. 6 is a sequence diagram illustrating an example process that may be implemented in the environment of FIG. 2 to update an incoming security of an IPsec network device, in accordance with implementations of the disclosure.

FIG. 6 is a sequence diagram illustrating an example process 600 that may be implemented in the environment of FIG. 2 to update an incoming security key of an IPsec networking device 200, in accordance with implementations of the disclosure. For example, an IPsec networking device 200 may perform some or all of the operations of process 600 by running a blockchain application 214 and IPsec application 215. In this example, blockchain network 360 may correspond to a blockchain network of IPsec networking devices 200 that communicate in accordance with an IPsec protocol.

As illustrated, an IPsec networking device 200 may prepare an incoming security key update request transaction 601 that is transmitted to blockchain network 360. The request may be performed using blockchain application 214. In some implementations, the transmitted transaction 601 may be performed when IPsec networking device 200 first joins blockchain network 360 and begins to establish IPsec sessions with other IPsec networking devices on blockchain network 360. Alternatively, the transmitted transaction 601 may be performed when an IPsec networking device 200 performs a key rollover function that requires the use of a new incoming security key. When an IPsec networking device changes a key during key rollover, it may lead to a single operation for all other devices in the system, and peers may be given adequate time based on the configuration to update those keys. The transaction 601 may be transmitted to blockchain network to verify that the incoming security key may be associated with IPsec networking device 200 and to update the blockchain to include the verified transaction (e.g., collectively come to a consensus). The incoming security key update transaction 601 may be digitally signed using a private key 213 of the IPsec networking device 200, and it may identify the IPsec networking 200 (e.g., by IP address).

In implementations, the incoming security key update transaction 601 may be broadcast to all or a subset of IPsec networking devices on blockchain network 360 by IPsec networking device 200. In implementations where the security key update transaction 601 is broadcast to a subset of IPsec networking devices, the transaction may be propagated by the receiving IPsec networking devices to other IPsec networking devices on the blockchain network that did not receive the broadcast.

Thereafter, the IPsec networking devices 200 of blockchain network 360 may come to a consensus 602 that validates the transaction 601 (e.g., by determining the updated incoming security key requested may be used by the IPsec networking device 200) and updates the blockchain with a block including the validated transaction. Any suitable blockchain consensus mechanism such as proof-of-work, proof-of-stake, proof-of-space, etc. may be used to validate the transaction. For instance, in one particular implementation, the consensus mechanism may comprise each of the IPsec networking devices 200 validating the transaction 601 against their respective copy of a blockchain 350 and running a proof of work algorithm to add a new block to the blockchain, the new block including the validated transaction. The added block may be propagated to all IPsec networking devices 200 to update their respective copy of the blockchain 350.

After a consensus 602 has been reached by the blockchain network 360, at sequence 603 the IPsec networking device 200 and (other IPsec networking devices) may receive a new block containing the validated transaction, which signifies approval of the incoming security key update. In some implementations, the new block may contain more than one approved incoming security key update. For example, a plurality of validated transactions 601 corresponding to different incoming security key update requests may be included in a block. Thereafter, at sequence 604, IPsec networking device 200 (and other IPsec networking devices on the blockchain) may update its respective copy of the blockchain 350 with the new block. Thereafter, once the blockchain 350 has been updated with the incoming security key, IPsec networking device 200, at sequence 605, may update SAs in IPsec SA database 216 and SPs in IPsec SP database 217 based on the updated incoming security keys included in the new block. Further, all other IPsec networking devices 200 may also update SAs in their respective IPsec SA database and SPs in their respective IPsec SP database based on the updated incoming security keys that published to the blockchain in the new block.

Figure 7:
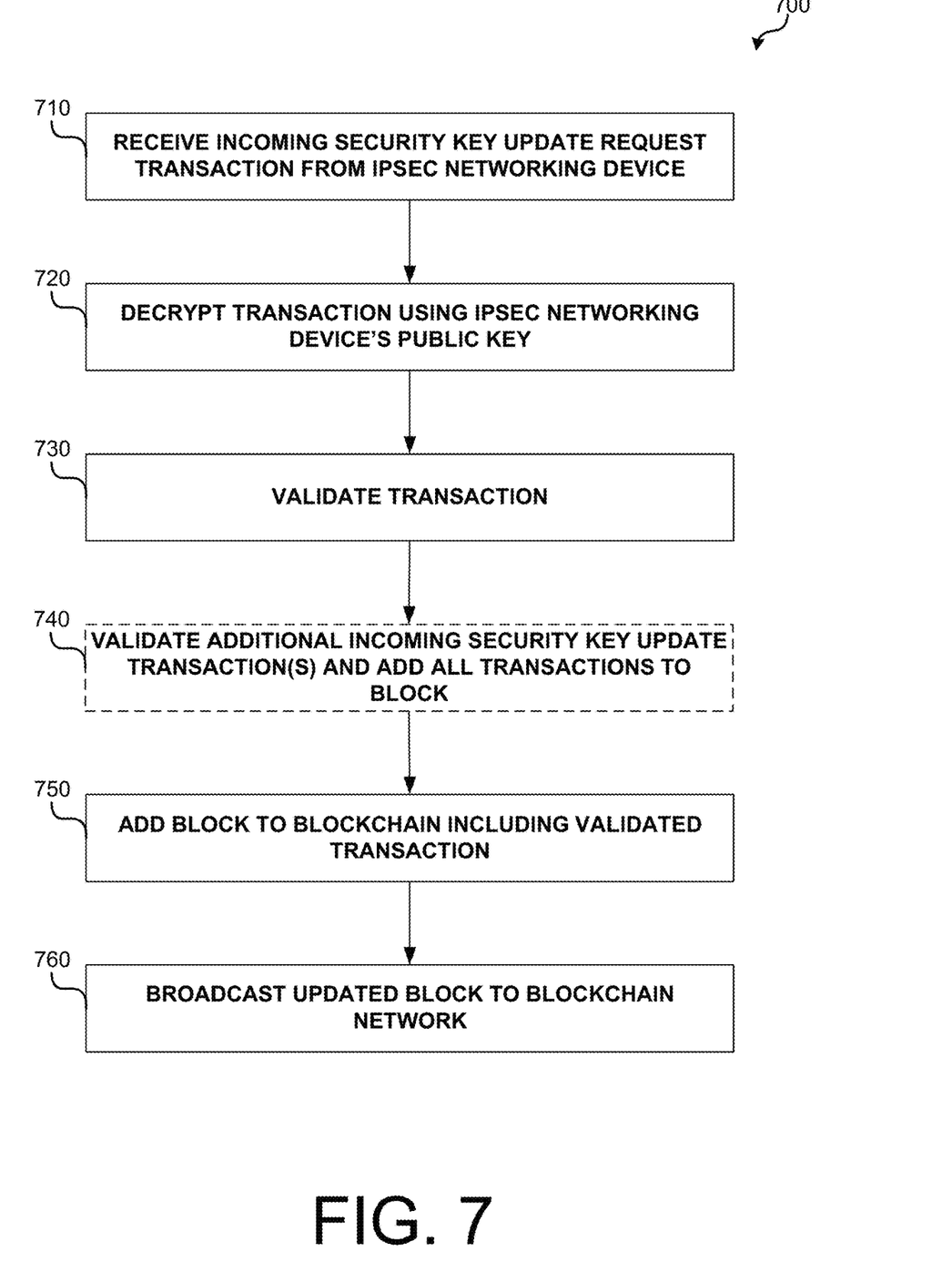
FIG. 7 is an operational flow diagram illustrating an example method that may be implemented by an IPsec networking device on a blockchain network to verify an incoming security key update transaction submitted by a peer IPsec networking device and update the blockchain, in accordance with implementations of the disclosure.

FIG. 7 is an operational flow diagram illustrating an example method 700 that may be implemented by a IPsec networking device (e.g., IPsec networking device 200) on a blockchain network (e.g. network 360) to verify an incoming security key update request transaction submitted by another IPsec networking device (e.g., IPsec networking device 200) and update the blockchain, in accordance with implementations. As noted above, the blockchain may be updated using any suitable consensus algorithm. In some implementations, the blockchain may be updated using a consensus based on a proof of work algorithm. In such implementations, for example, a secure hash algorithm (SHA) or other suitable proof-of-work algorithm may need to be produced to create a new block. In some instances, all IPsec networking devices, including the transacting IPsec networking device, may solve the proof-of-work algorithm.

With specific reference now to the operations of method 700, at operation 710, a first IPsec networking device of a blockchain network may receive an incoming security key update request transaction (e.g., a transaction 601) from a second IPsec networking device. For example, the first IPsec networking device may receive a transaction message that was broadcast or otherwise propagated by the second IPsec networking device to a blockchain network for verification. In various implementations, the received transaction may be a digitally signed message that was encrypted with the second IPsec networking device's private key. For example, the digitally signed message may be a string of text generated by applying the second IPsec networking device's private key to the transaction.

At operation 720, the first IPsec networking device may decrypt the received incoming security key update request transaction (e.g., digitally signed message) to verify that the second IPsec networking device is the source of the request. For example, the first IPsec networking device may apply the second IPsec networking device's public key (e.g., known from a list of IPsec networking device public keys as described above with reference to FIG. 5) to the message to decrypt it.

At operation 730, the first IPsec networking device may validate the incoming security key update request transaction. Any suitable blockchain validation method may be used.

At optional operation 740, the first IPsec networking device may validate additional security key update request transactions. For example, additional transactions shared by other IPsec networking devices may be validated by the first IPsec networking device (and decrypted) at around the time it validates the transaction received from the second IPsec networking device. Alternatively, operation 740 may be skipped if no other security key update request transactions require validation (e.g., depending on times when different transactions are received). Following validation, at operation 750, the first IPsec networking device may add a new block to its respective copy of the blockchain, the added block including all of the validated IP security key update request transactions.

In some implementations, the security key update request transactions may be validated and the block may be added by solving a proof-of-work algorithm. At operation 760, the first IPsec networking device may share the added block to the blockchain network for other IPsec networking devices to update their respective copy of the blockchain.

Figure 8:
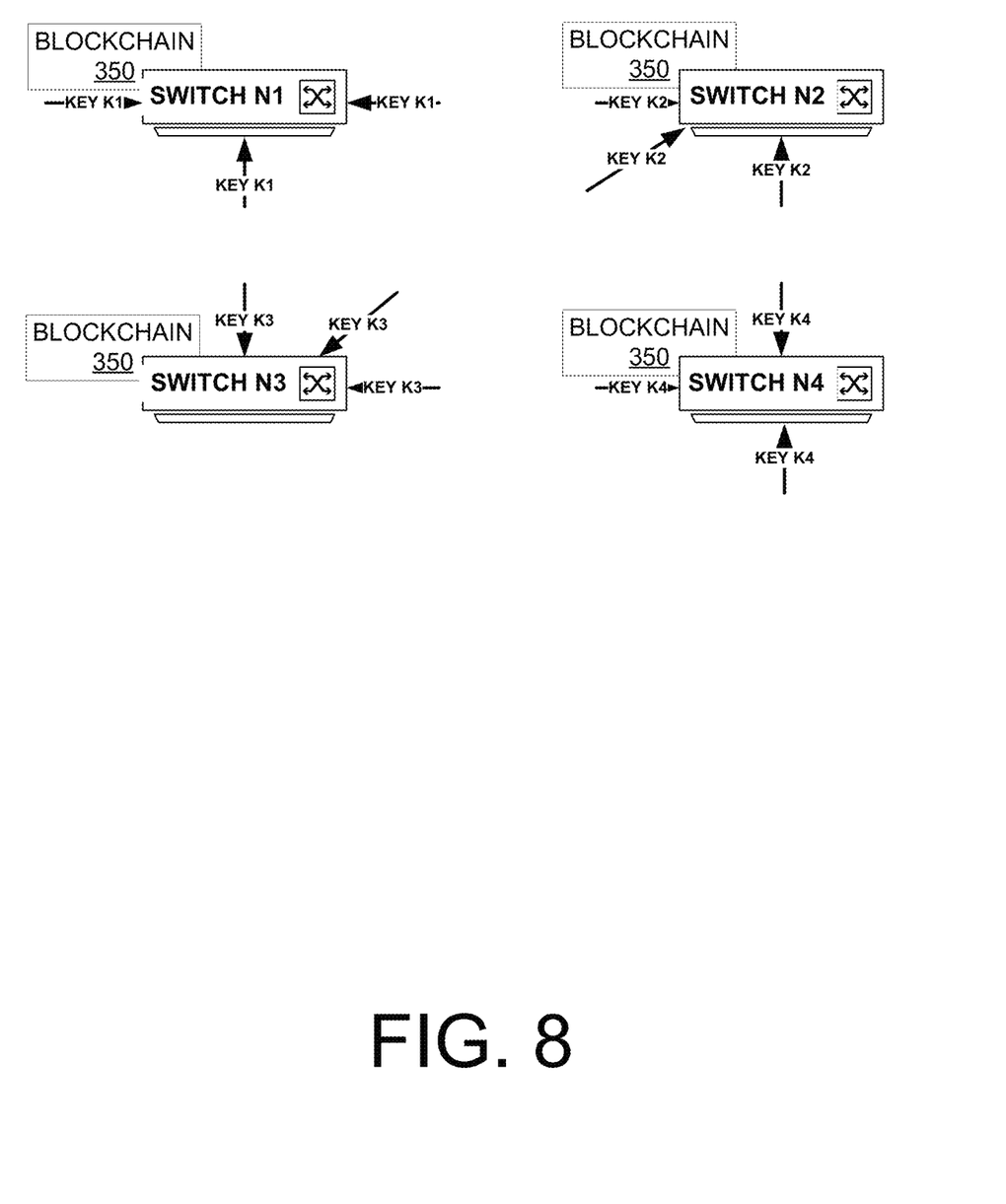
FIG. 8 illustrates an example of incoming security key assignment in accordance with implementations of the disclosure.

FIG. 8 illustrates an example of incoming security key assignment in accordance with implementations of the disclosure. Specifically, FIG. 8 illustrates the alternative implementation of the four IPsec enabled gateway switch devices of FIG. 1 where they operate as a blockchain network, each device including a blockchain 350. As illustrated in this implementation, only one incoming SA is utilized per device. The total number of SAs in this example is N+1 (where N is a positive integer representing the number of peers). During key rollover, there may be N+2 SAs.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   preparing, at a first networking device, an incoming security key update request transaction, the incoming security key update request transaction comprising a request by the first networking device to use an incoming security key for incoming communications with other networking devices during an IPsec session, wherein the first networking device and the other networking devices communicate over a blockchain network including a blockchain;
   transmitting the incoming security key update request transaction from the first networking device to the blockchain network for validation;
   updating a copy of the blockchain with a block, the block comprising a validation of the incoming security key update request transaction that was transmitted to the blockchain network; and
   using at least the updated blockchain to update an IPsec security association (SA) or an IPsec security policy (SP) used by the first networking device.

2. The method of claim 1, further comprising: receiving, at the first networking device, the block from the blockchain network, wherein the first networking device performs the operation of updating the copy of the blockchain.

3. The method of claim 1, wherein the block comprises a validation of a plurality of incoming security key update request transactions, each of the transactions transmitted by a respective one of a plurality of networking devices of the blockchain network, each of the plurality of incoming security key update request transactions comprising a respective incoming security key for incoming communications with other networking devices during an IPsec session.

4. The method of claim 3, further comprising: using the updated blockchain to update a plurality of IPsec SAs used by the first networking device, wherein each of the plurality of IPsec SAs is updated using a respective one of the plurality of incoming security keys.

5. The method of claim 1, wherein the incoming security key update request transaction is transmitted by the first networking device to the blockchain network during a security key rollover of the first networking device's incoming security key.

6. The method of claim 1, wherein the incoming security key update request transaction is transmitted by the first networking device to the blockchain network when the first networking device initiates an IPsec session with a device on the blockchain network.

7. The method of claim 1, wherein each networking device of the blockchain network is configured to transmit security key update request transactions to be verified and added to the blockchain, wherein each of the networking devices of the blockchain networks maintains a copy of the blockchain.

8. The method of claim 1, wherein each of the networking devices of the blockchain network are located in a respective private network, wherein each of the networking devices of the blockchain network communicate with other networking devices over a public network using a virtual private network.

9. A non-transitory computer readable medium having executable instructions stored thereon, that, when executed by a processor, performs operations of:
preparing, at a first networking device, an incoming security key update request transaction, the incoming security key update request transaction comprising a request by the first networking device to use an incoming security key for incoming communications with other networking devices during an IPsec session, wherein the first networking device and the other networking devices form a distributed ledger network including a distributed ledger, the distributed ledger comprising a history of incoming security keys used by the first networking devices and the other networking devices during IPsec sessions; and
transmitting the incoming security key update request transaction from the first networking device to the distributed ledger network for validation.

10. The non-transitory computer readable medium of claim 9, wherein the executable instructions, when executed by the processor, further perform an operation of: receiving, at the first networking device, an update to the distributed ledger from the distributed ledger network, the update comprising a validation of the incoming security key update request transaction that was transmitted to the distributed ledger network.

11. The non-transitory computer readable medium of claim 10, wherein the executable instructions, when executed by the processor, further perform an operation of: using at least the update to the distributed ledger to update an IPsec security association (SA) and an IPsec security policy (SP) at the first networking device.

12. The non-transitory computer readable medium of claim 11, wherein the update comprises a validation of a plurality of incoming security key update request transactions, each of the transactions transmitted by a respective one of a plurality of networking devices of the distributed ledger network, each of the plurality of incoming security key update request transactions comprising a respective incoming security key for incoming communications with other networking devices during an IPsec session.

13. The non-transitory computer readable medium of claim 9, wherein the incoming security key update request transaction is transmitted by the first networking device to the distributed ledger network during a security key rollover of the first networking device's incoming security key.

14. The non-transitory computer readable medium of claim 9, wherein the incoming security key update request transaction is transmitted by the first networking device to the distributed ledger network when the first networking device initiates an IPsec session with a device on the distributed ledger network.

15. The non-transitory computer readable medium of claim 9, wherein each networking device of the distributed ledger network is configured to transmit security key update request transactions to be verified and added to the distributed ledger, wherein each of the networking devices of the distributed ledger network maintains a copy of the distributed ledger.

16. The non-transitory computer readable medium of claim 9, wherein each of the networking devices of the distributed ledger network is located in a respective private network, wherein each of the networking devices communicate with other networking devices of the distributed ledger network using a virtual private network.

17. The non-transitory computer readable medium of claim 11, wherein the distributed ledger network is a blockchain network, wherein the distributed ledger is a blockchain, wherein the update to the distributed ledger from the distributed ledger network comprises a block, the block comprising a validation of the incoming security key update request transaction that was transmitted to the distributed ledger network, wherein updating the copy of the distributed ledger with the update comprises adding the block to a copy of the blockchain.

18. A system, comprising:
a first networking device located in a first private network; and
a second networking device located in a second private network and configured to communicate with the first networking device over a public network using a virtual private network,
where each of the first and second networking devices comprises a blockchain application configured to communicate over a blockchain network to transmit incoming security key update request transactions, the incoming security key update request transaction comprising a request by the networking device to use an incoming security key for incoming communications with other networking devices over a virtual private network.

19. The system of claim 18, wherein each of the first and second networking devices maintains a copy of a blockchain of the blockchain network, the blockchain comprising a history of incoming security keys used by the first networking device and the second networking device during IPsec sessions.

20. The system of claim 19, wherein each of the first and second networking devices is configured to maintain a database of IPsec security associations (SAs) and a database of IPsec security policies (SPs), wherein the database of IPsec SAs and the database of IPsec SPs are updated over time using new blocks added to the blockchain that contain validated incoming security key update request transactions.

* * * * *